Sept. 3, 1946.    J. E. SHEPHERD ET AL    2,406,858
VISUAL POSITION AND PHASE SENSE INDICATOR
Filed April 15, 1943    8 Sheets-Sheet 1

INVENTORS:
J. E. SHEPHERD
J. D. MALLETT
BY Herbert H. Thompson
THEIR ATTORNEY

Sept. 3, 1946.  J. E. SHEPHERD ET AL  2,406,858
VISUAL POSITION AND PHASE SENSE INDICATOR
Filed April 15, 1943  8 Sheets-Sheet 2

INVENTORS:
J. E. SHEPHERD
J. D. MALLETT
BY Herbert H. Thompson
THEIR ATTORNEY

Sept. 3, 1946.     J. E. SHEPHERD ET AL     2,406,858
VISUAL POSITION AND PHASE SENSE INDICATOR
Filed April 15, 1943     8 Sheets-Sheet 3

INVENTORS:
J. E. SHEPHERD
J. D. MALLETT
BY Herbert H. Thompson
THEIR ATTORNEY

Sept. 3, 1946.   J. E. SHEPHERD ET AL   2,406,858
VISUAL POSITION AND PHASE SENSE INDICATOR
Filed April 15, 1943   8 Sheets-Sheet 4

INVENTORS:
J. E. SHEPHERD
J. D. MALLETT
BY Herbert H. Thompson
THEIR ATTORNEY

Sept. 3, 1946.   J. E. SHEPHERD ET AL   2,406,858
VISUAL POSITION AND PHASE SENSE INDICATOR
Filed April 15, 1943    8 Sheets-Sheet 6

INVENTORS:
J. E. SHEPHERD
J. D. MALLETT
BY
THEIR ATTORNEY

Sept. 3, 1946.  J. E. SHEPHERD ET AL  2,406,858
VISUAL POSITION AND PHASE SENSE INDICATOR
Filed April 15, 1943  8 Sheets-Sheet 7

INVENTORS:
J. E. SHEPHERD
J. D. MALLETT
BY Herbert H. Thompson
THEIR ATTORNEY

Patented Sept. 3, 1946

2,406,858

UNITED STATES PATENT OFFICE 2,406,858

VISUAL POSITION AND PHASE SENSE INDICATOR

James E. Shepherd, Hempstead, and John D. Mallett, Garden City, N. Y., assignors to Sperry Gyroscope Company, Inc., a corporation of New York Application April 15, 1943, Serial No. 483,218

24 Claims. (Cl. 177—351)

Our invention more particularly relates to means and systems for providing an indication of the displacement and phase senseor direction of a displaceable member relative to a reference element or axis, and to such a means or system which will provide the resultant position of a displaceable member when moved in more than one plane of motion such, for example, as the position of a scanning member when moved in azimuth and elevation with respect to a chosen axis of the craft on which it is mounted.

It is an object of our invention to provide a system comprising a cathode ray tube for providing a visual indication both as to position and direction or phase sense of an element relative to a reference axis.

Another object resides in providing a positional indicating system of the above character in which the Lissajous figure of the cathode ray tube is modified by phase-sensitive means so as to provide not only a positional indication but also a directional or phase sense indication.

Another object resides in providing a system of the foregoing character in which the Lissajous figure traced by the cathode ray is varied in light intensity through the medium of a modulating circuit to provide a phase-sensitive position indication.

A still further object resides in providing phase and positional indicating systems of the foregoing characters in combination with a scanning system or in combination with a data transmission system, whereby to provide a visual indication of the magnitude and direction of error or the magnitude and direction of displacement of the pole of the scanning member relative to any given axis of the craft on which it is mounted.

With these and other objects in view, our invention includes the novel combinations and correlation of elements described below and illustrated in the accompanying drawing, in which—

Figure 1:
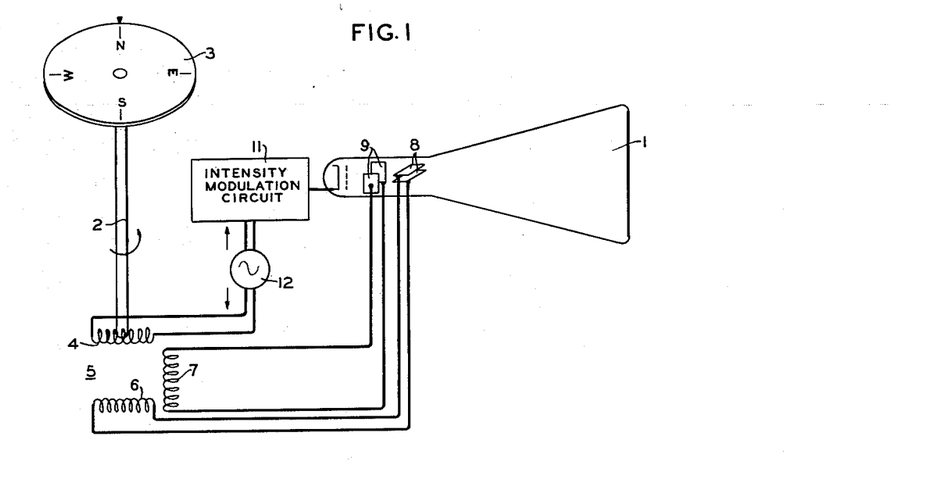
Fig. 1 represents somewhat schematically our positional indicating system arranged to indicate rotation of a member in a single plane of movement.

A simple application of our invention is disclosed in Fig. 1, wherein the cathode ray tube indicated generally at 1 is arranged to provide an indication of rotation of a shaft 2 and also to provide the phase sense of this rotation. For explanatory purposes we have shown the shaft 2 as associated with a compass card 3 and connected with the rotor 4 of a two-phase "Autosyn" or Telegon or rotatable transformer indicated generally at 5. The stator windings 6 and 7 of the "Autosyn" are connected across the pairs of deflecting plates 8 and 9, respectively, of the cathode ray tube 1. With the "Autosyn" 5 connected in this manner to the cathode ray tube and assuming that a cathode ray emission occurs, a substantially linear Lissajous figure will be traced thereby on the screen of the cathode ray tube, as illustrated by way of example in Fig. 3 and indicated at 10. The line 10 will extend to equal distances on opposite sides of the electrical center of the tube, and the length thereof will be a function of the deflecting voltages applied to the plates 8 and 9. Assuming that the alternating voltage applied to the rotor 4 is held constant in peak value and the shaft 2 is rotated, the Lissajous figure 10 will rotate with the shaft 2, maintaining a substantially constant length. Under these conditions, the linear Lissajous figure will provide an indication of the movement of shaft 2 or the compass card 3, but since it is a double-valued function, it will provide no directional or phase indication. In other words, from a reading thereof it would be impossible to determine whether the shaft and compass card had been rotated throughout 180° or 360°.

In accordance with our invention, an intensity modulation circuit, indicated generally at 11, is connected to the same source of pulsating or alternating current energy 12 as is used in exciting the rotor winding 4 of the "Autosyn" 5, and the output thereof is connected with either the grid or the cathode element of the cathode ray tube 1. Preferably, and in accordance with our invention, we employ circuits, such as indicated generally at 11 and thereinafter more particularly described, to modulate the intensity of the cathode ray emission whereby to vary the appearance of the Lissajous figure on the screen of the cathode ray tube relative to the electrical axis thereof and thus to provide not only a positional indication but also a directional or phase sense indication.

Figure 3:
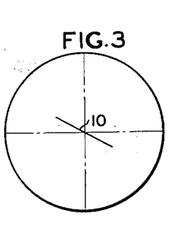
Figs. 3, 4, 5 and 6 are views similar to Fig. 2, showing cathode ray Lissajous figures, the first being of conventional form and the others modified in accordance with our invention.
Figure 4:
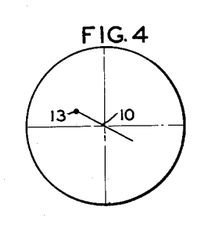
Figure 5:
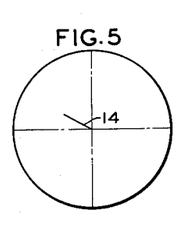
Figure 6:
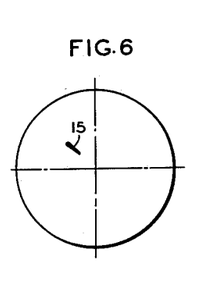

According to our invention, the linear Lissajous figure obtained, as shown in Fig. 3, may be modified by increasing the light intensity thereof to one side of the electrical axis of the tube whereby to differentiate one end of the line with respect to the other end thereof. For example, as shown in Fig. 4, the intensity modulation circuit may be arranged to provide a bright spot as indicated at 13 at one end of the line of the Lissajous figure 10. Furthermore, the Lissajous figure may be extinguished to one side of the electrical axis of the tube whereby to provide but half a figure, as indicated at 14 in Fig. 5. Further, in accordance with our invention, substantially more than half of the Lissajous figure may be cut off, leaving but a fractional part thereof, indicated at 15 in Fig. 6. The Lissajous figure 15, as shown, may have maximum light intensity at the outer end thereof with the intensity of the figure substantially uniformly decreasing to the point of extinguishment of the figure. The manner in which the Lissajous figure of this character may be formed will be apparent from the description of one of the modified circuits of our invention, hereinafter set forth.

Figure 2:
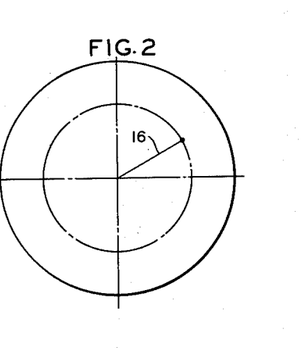
Fig. 2 illustrates the preferred character of positional and phase indication provided by the cathode ray tube of Fig. 1.
Figure 9:
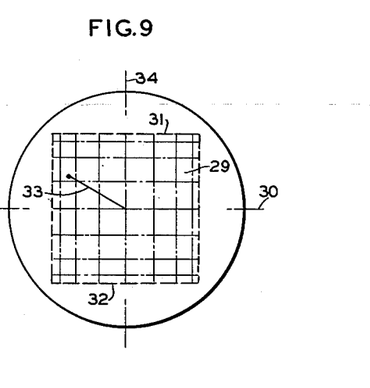
Fig. 9 represents the screen of a cathode ray tube bearing a chart thereon for use with a scanning system.

In practice, we prefer to eliminate substantially one half of the Lissajous figure 10 and also to apply a bright spot to the outer end thereof, as illustrated in Figs. 2 and 9, and it will be clear from the description of the circuit providing a figure of this character how the cathode of the cathode ray tube may be modulated to provide either or both phase-indicating characteristics. In Fig. 2, the Lissajous figure 16 will provide a phase-sense indication of the displacement in rotation of shaft 2 and compass card 3 with respect to a given reference plane, the dot-dash circle being the locus of the bright spot for constant deflection voltage excitation.

With constant excitation voltage, the Lissajous figure will be of substantially the same radial length measured from the electrical center of the tube for all angular positions thereof, as hereinabove described. However, the radial length of the figure may be varied by varying the amplitude of the deflection voltages as an indication or measurement of some other parameter as, for example, engine speed. Hence, the diameter of the circular locus of the ends of the Lissajous figure or the bright spot may be varied so that the angular position of the figure will provide an indication of angular displacement, while the length of the figure or radial displacement of the bright spot will provide an indication of another parameter.

Figure 7:
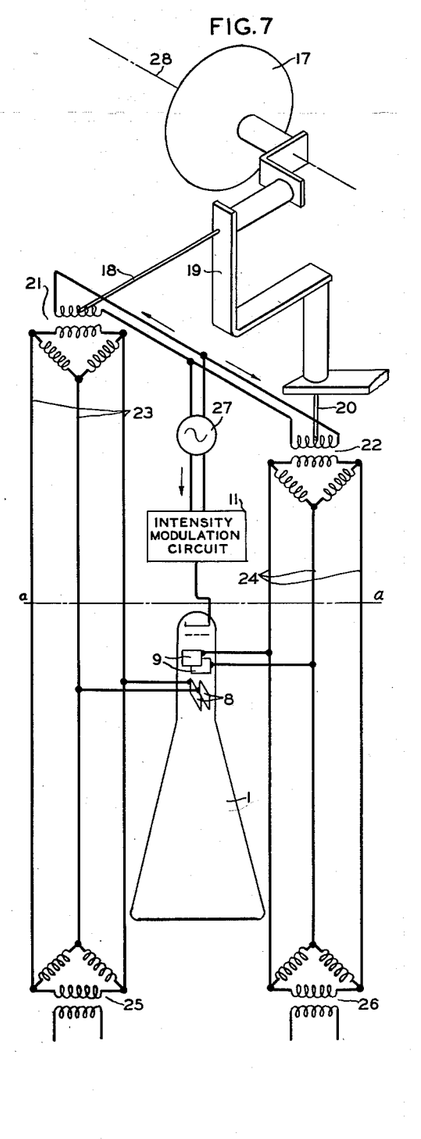
Fig. 7 is a schematic representation of the system of our invention applied to the data transmission system of a scanner.

In Fig. 7, we have shown our system associated with a schematically represented scanning system. The scanning system comprises a scanning member 17 which is mounted to rotate in elevation about an elevation axis 18. The elevation axis passes through a frame 19 which in turn is mounted to rotate in azimuth about the azimuth axis 20. "Autosyn" transmitters 21 and 22 are positioned with their rotors arranged to rotate with the scanning member 17 about its elevation and azimuth axes, respectively. The stators of these "Autosyns" are connected respectively through conductors 23 and 24 with "Autosyn" receivers 25 and 26, the rotors of which may be geared to computers or other devices. The rotors of the transmitter "Autosyns" 21 and 22 are connected to a source of alternating current energy 27. In order to determine the position of the pole or pole axis 28 of the scanner member 17 with respect to any chosen axis of the craft on which it is mounted, for example, the fore and aft axis, we propose to connect the pairs of deflecting plates 8 and 9 of the cathode ray tube 1 across two legs, respectively, of the data transmission systems and between the "Autosyn" transmitters and receivers, as shown in Fig. 7. Accordingly, the deflecting voltages supplied to the plates 8 will control the position of the Lissajous figure in accordance with movements of the scanning member in elevation, while the pair of plates 9 will in like manner control the position of the Lissajous figure in accordance with movements of the scanner about its azimuth axis. In this case the trace 33 does not necessarily remain constant in length, since its length depends upon the resultant of the azimuth and elevation angles of the scanner 17. An intensity modulation circuit, represented generally at 11, is connected with the grid or cathode element of the cathode ray tube 1 and the source of alternating current energy 27.

The screen of the tube 1 may be calibrated in the form of a chart indicated generally at 29, which chart, on a plane surface, is intended to be the conformal representation in Cartesian coordinates of the hemisphere in spherical coordinates through which the pole axis of the scanner member may sweep. This chart may be considered as somewhat similar to the Mercator's chart, or as formed along the lines of the Mercator type of projection. In our chart, the elements of the hemisphere are projected through normals to the surface of a cylinder and thence projected through normals to a plane surface. In other words, the axis or line 30 will represent the equator, undistorted except for foreshortening at its ends, and the lines 31 and 32 are representative of points in spherical coordinates which are the zenith and nadir, respectively.

With this arrangement the Lissajous figure 33 will be positioned along the axis 30 in azimuth by the deflecting plates 9 and therefore will respond to azimuthal rotation only of the scanning member. The plates 8, however, will control the position of the figure 33 along the axis 34 and in accordance with movements of the scanning member in elevation. The position which the Lissajous figure 33 occupies on the screen of the cathode tube will be the resultant, at any one instant, of the angular displacement of the pole axis of the scanner in azimuth and elevation with respect to a chosen axis of reference. In practice, we prefer to employ an axis parallel to the fore and aft axis of the craft as the reference axis of the scanning member which, on the screen of the tube, is represented by the intersection of the axes 30 and 34. With this construction, the figure 33 will represent the true position and direction of the scanner axis with respect to the hemisphere which it may traverse.

Figure 8:
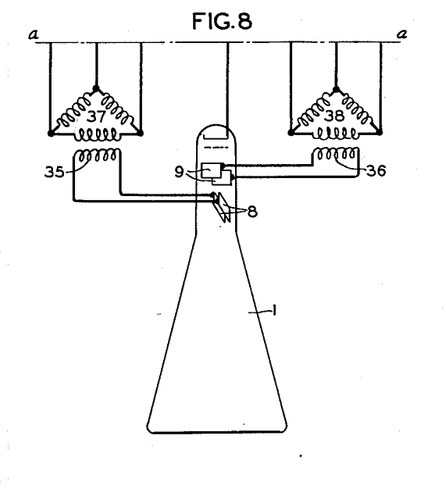
Fig. 8 discloses an alternative manner in which the system of our invention may be connected to a scanner unit.

In connection with the arrangement shown in Fig. 7, it may be pointed out that comparatively high grade "Autosyn" elements should be employed in order that no reaction will be produced from the receivers which may affect the positional indication afforded by the cathode ray tube. In other words, the deflection voltages on the tube should be functions of the angular displacements only of the scanning member in elevation and azimuth rather than a function of the error of the receiver "Autosyns" of the computer systems when lagging the scanner. To overcome any difficulties of this nature, the deflecting voltages for the cathode ray tube may be obtained from the secondaries 35 and 36 of receiver "Autosyns" 37 and 38, respectively, which may be connected to the outputs of the transmitters 21 and 22 of Fig. 7, as represented by the dash-dot line a—a. This arrangement is shown in Fig. 8. The cathode or grid of the tube is, of course, connected with a modulation circuit indicated generally at 11, which is preferably of the character of the circuits hereinafter described and which in turn is connected to the source of alternating current energy 27.

It will be observed that the deflecting plates of the tube may be connected in either of the manners above described and, furthermore, that the deflecting voltages may be derived as in Fig. 7 from a closed servo system even though substantially zero error occurs, that is, when the follow-up element is closely tracking the reference element.

Figure 10:
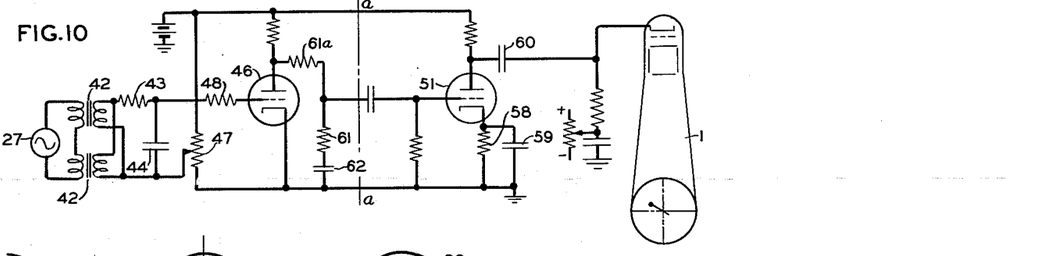
Fig. 10 is a wiring diagram of the preferred intensity modulation circuit of our invention.

In Fig. 10, we have shown a wiring diagram of a preferred form of intensity modulation circuit for controlling the emission of the cathode roy beam of the cathode ray tube and the intensity thereof in forming a Lissajous figure. Since the deflecting plates 8 and 9 of the tube are supplied with deflecting voltages derived from the source of alternating energy 27, the circuit of our invention is preferably also connected thereto to provide a reference voltage in phase with the deflecting voltages on the plates of the tube. This reference voltage is indicated by the sinusoidal curve 39 of Fig. 11 and is representative of the phase of the energy supplied from the source 27 to the circuit of Fig. 10 and the phase of the deflecting voltages on the plates 8 and 9 of the tube. These deflecting voltages, elevation and azimuth, are indicated by the curves 40 and 41, respectively, in Fig. 11, and it will be observed that they may be in phase or in phase opposition with the reference voltage.

According to our invention, the energy from source 27 is fed through a phase-shifting circuit comprising the inductive coupling 42, resistor 43, and condenser 44. The shifted reference voltage is represented by the curve 45 in Fig. 11 and, as so shifted, is supplied to the grid of the electron tube 46. By means of the potentiometer 47 which provides a bias on the grid of tube 46, the voltage wave is narrowed on its negative half cycle, as represented at 49. The tube 46 serves to square and narrow the voltage wave through the operation of grid resistor 48 which limits it as to positive polarity and of the plate current cut-off which limits it as to negative polarity. Therefore, the voltage appearing on the plate of tube 46 will be of the character represented by the curve 50. The narrowing of the grid voltage wave will cause a rapid increase and decrease in the plate voltage, thereby providing plate voltage impulses with substantially sharp sides, while the current cut-off will flatten the top of the impulses.

It will be observed that, due to the shifting of the voltage in phase with respect to the deflection voltages on the plates of the cathode ray tube 1 and due to the narrowing of the wave through the operation of the bias provided by potentiometer 47, the sharp increase in the voltage on the plate of tube 46 will occur substantially at the respective peaks of the deflection voltages on the cathode ray tube which together represent one end of the Lissajous figure.

Figure 11:
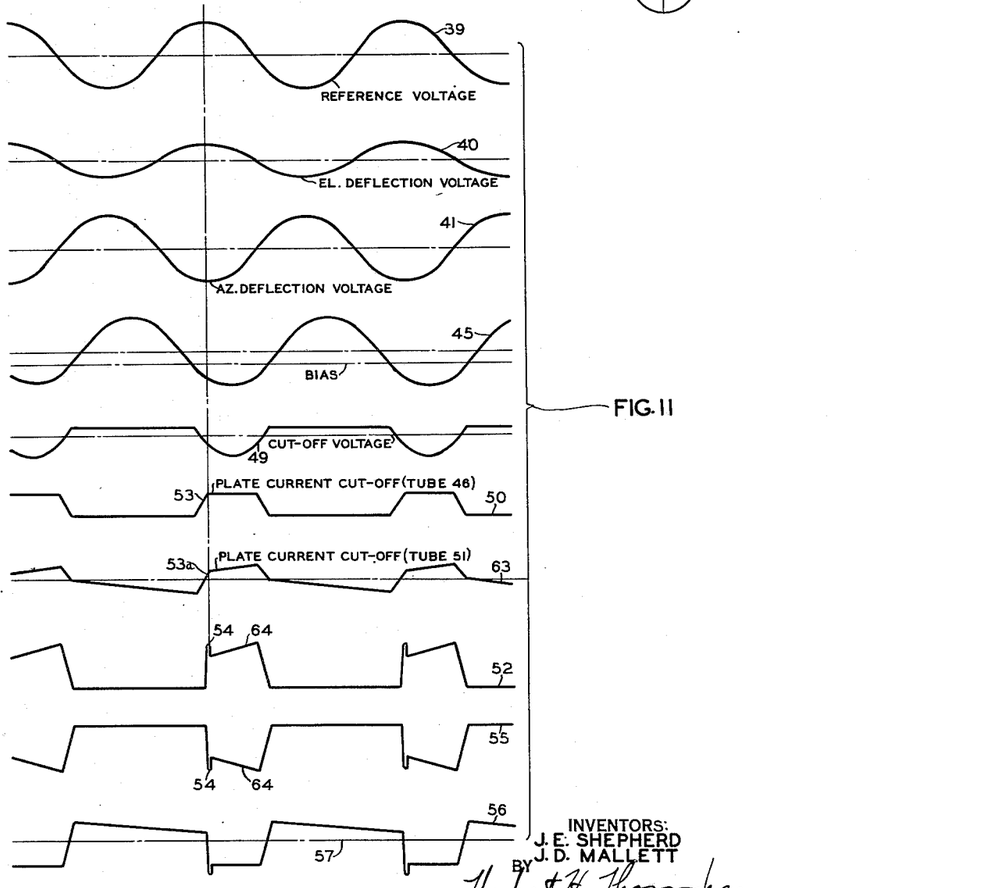
Fig. 11 represents the transformation of the character of the energy employed in modulating the cathode of the cathode ray tube throughout the stages of the circuit of Fig. 10.

When the voltage wave from the plate of tube 46 is supplied to the grid of tube 51, the plate current of tube 51 will have a wave form of the general character of that represented by curve 52, that is, the voltage impulse will comprise an initial component of relatively high amplitude, and the balance thereof will be of lesser amplitude. The component of high amplitude is produced by the sharp rise in plate voltage of tube 46 indicated at 53 on curve 50 and the corresponding sharply rising voltage supplied to the grid of tube 51. It will be observed that the high peak current component, indicated at 54 of the curve 52, will occur substantially at the peaks of the deflecting voltages supplied to the cathode ray tube and, therefore, will produce, when supplied as a negative voltage indicated by curve 55 from the plate of tube 51 to the cathode of the cathode ray tube, a spot or point of high intensity of illumination in the Lissajous figure.

The negative voltage impulse supplied from the plate of tube 51 serves to control the intensity of the illumination of the Lissajous figure while the cathode is modulated thereby, and preferably the cathode of the tube is biased below its cut-off voltage so that a cathode emission will occur only while a negative value of voltage impulse is supplied thereto as represented by the curve 56 wherein the cathode emission will occur only for values of the voltage wave below the dot-dash reference line 57.

In order for the tube 51 to provide a voltage output having the relatively high peak 54 as a component thereof, the cathode of this tube is included in a differentiating or degenerating circuit comprising the resistor 58 and by-pass condenser 59. The by-pass condenser functions to pass high frequency components therethrough and thus, when the grid voltage increases sharply as represented by the zone 53a of curve 63, tube 51 will have a relatively high gain, thereby producing the peak 54 in the plate current or plate voltage curve. However, for slow changes in grid voltage, the by-pass condenser 59 will not be effective, and therefore the tube 51 will be highly degenerated providing a relatively low gain.

If the voltage for biasing the cathode of the tube 1 were produced merely through the functioning of the above-described elements of our circuit and coupled to the tube 1 through a low capacitance coupling as indicated by the condenser 60, an exponential decay of the voltage over the substantially flat portions of the curve would occur, and, therefore, following the bright spot, the remainder of the Lissajous figure would gradually decrease in intensity. In order to correct for the decay caused in low capacitance couplings and to provide a Lissajous figure which is of substantially uniform intensity except for the bright spot therein, we provide an integrating circuit comprising resistors 61a and 61 and condenser 62 in the output circuit of tube 46. This circuit serves to integrate with respect to time the flat portions of the plate voltage curve 50 so that the curve of the voltage supplied to the grid of tube 51 will be of the character indicated by curve 63 in Fig. 11. Therefore, the otherwise flat portion of the curve 52, representing the plate current of tube 51, which follows the initial high peak component 54, will be of a substantially uniformly and relatively slowly rising character, as indicated at 64. Correspondingly, the voltage of the plate of tube 51 will have the peak and uniformly rising characteristics of the plate current, as shown in curve 55. When this voltage is supplied through the low capacitance coupling 60 to the cathode of the cathode ray tube, it will have a wave form of the character shown in the curve 56.

It will be noted that, due to the fact that the voltage wave is narrowed as shown by curve 49, it is not necessary to shift the reference voltage through 90°, since narrowing of the voltage wave will cause the high peak voltage in the output of the circuit to occur substantially at the peak of the reference voltage wave. Furthermore, it will be observed that the time interval through which a cathode ray emission occurs when a cut-off bias is employed, as hereinbefore indicated, depends upon the duration of the negative value voltage impulse supplied thereto from the demodulation circuit. In the embodiment disclosed, the voltage impulse does not exceed a 90° phase time interval, and therefore the Lissajous figure will not extend beyond the electrical center of the tube. If more than half of the figure is desired, the potentiometer 47 may be adjusted to provide a longer cut-off value for the tube 46.

Figure 12:
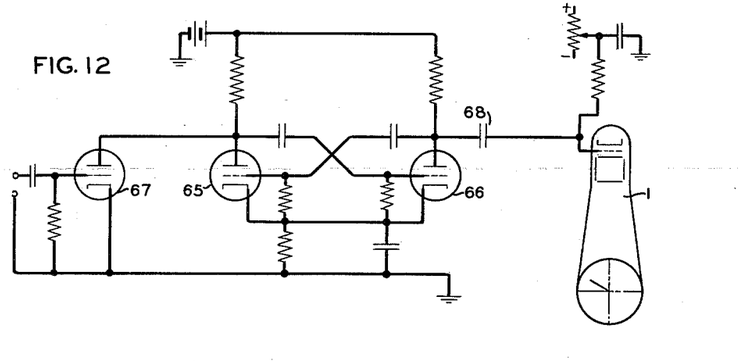
Fig. 12 is a wiring diagram of a circuit which may be employed in modulating the voltage on the grid of the cathode ray tube.
Figure 13:
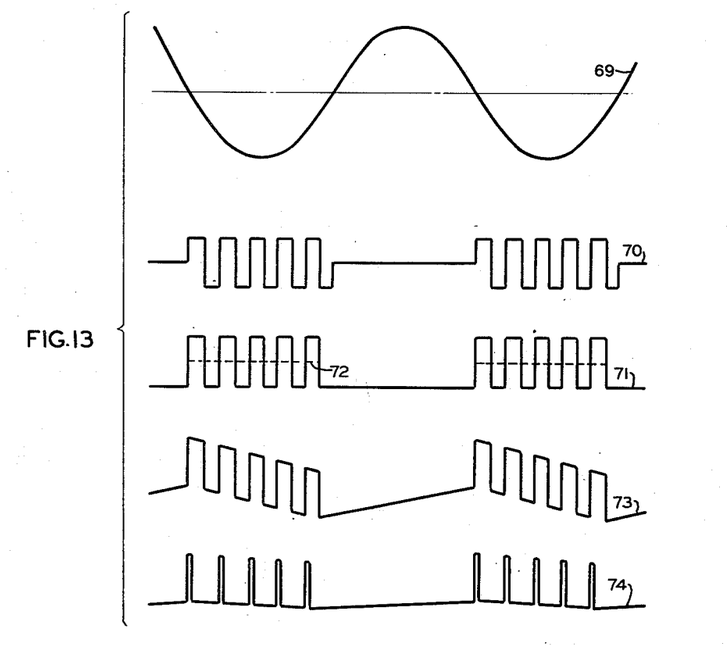
Fig. 13 discloses the character of the voltage output from the circuit of Fig. 12.

In Fig. 12, we have shown a grid modulating circuit for producing a Lissajous figure, substantially one-half of which is extinguished. The circuit comprises essentially a multivibrator circuit including the tubes 65 and 66 which circuit is controlled by tube 67 connected in shunt therewith and the output of which is coupled through the capacitance coupling 68 to the grid of the cathode ray tube 1. In this circuit, the reference voltage, which may be considered in phase with the deflecting voltages on the plates of the cathode ray tube, is supplied to the grid of tube 67. When this tube is conducting, it shunts out the multivibrator circuit, and no voltage output occurs therefrom. However, when the reference voltage goes negative, as indicated by curve 69 in Fig. 13, the multivibrator circuit functions to produce a voltage output which should resemble in curve character the curve shown at 70. Actually, the output of the multivibrator circuit will be of the form shown by curve 71 which is similar to curve 70 with the exception that a wave of the fundamental or reference frequency is added thereto, as represented by the dash lines 72. When this voltage wave is coupled through the capacitance coupling 68, assuming that it is of low capacitance value, the voltage supplied to the grid of tube 1 will be of the character illustrated by curve 73. Because the multivibrator produces a substantially instantaneous and full amplitude voltage wave at the inception of operation thereof, and also to tube cut-off condition, the Lissajous figure at the points of cathode ray emission and cut-off will be sharply defined, but due to the capacitance coupling will decrease in intensity toward the cut-off. A more uniform intensity of the Lissajous figure may be obtained by making the multivibrator of a non-symmetrical character in order substantially to reduce the effect of the reference wave as a component thereof and to produce a voltage wave of the character shown by the curve 74.

Practically the same results may be obtained by deriving the modulating voltage from the plate of tube 65 in the circuit of Fig. 12 rather than from the plate of tube 66 as therein illustrated. The output from tube 65 may be considered more desirable since with this connection no "pip" will appear in the circuit output when the multivibrator is cut off. Furthermore, if the multivibrator circuit is not sufficiently biased as to cut off completely, a small fringe of vibrations may occur which is positive with respect to the wave axis when the output is derived from the plate of tube 66 and negative when derived from the plate of tube 65.

Figure 14:
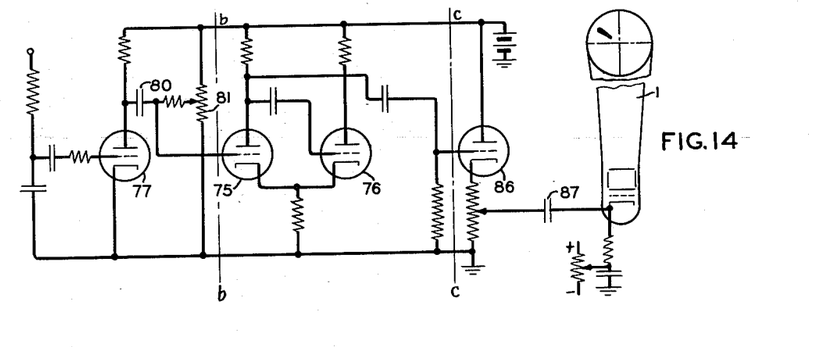
Fig. 14 is a wiring diagram of a modified form of circuit somewhat similar to that shown in Fig. 12.
Figure 15:
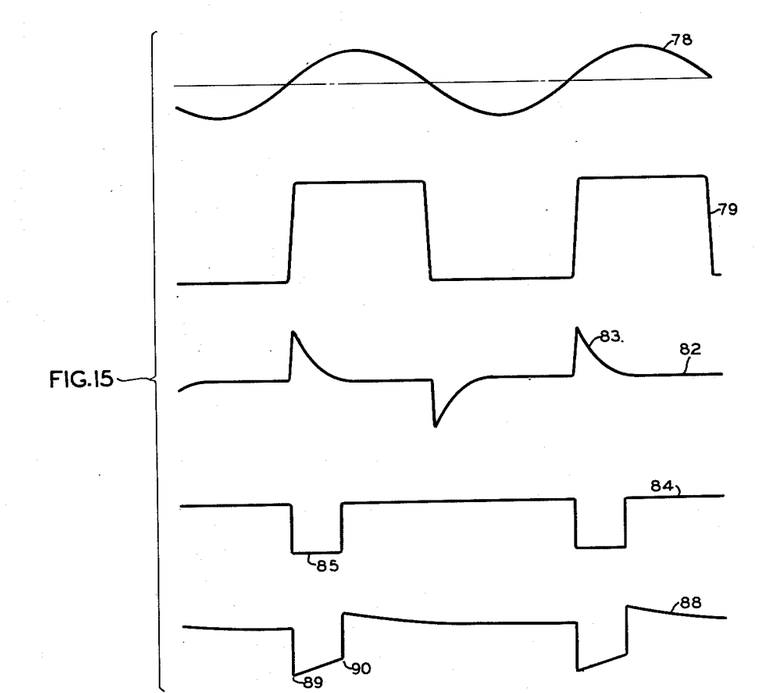
Fig. 15 represents the manner in which the circuit of Fig. 14 is controlled and the form of the voltage output therefrom.

Fig. 14 illustrates a wiring diagram including a delay type multivibrator circuit of the general character shown in Fig. 12 but in which a derivative component of the reference voltage is employed to control the multivibrator circuit. This circuit includes the electron tubes 75 and 76 connected in a multivibrator circuit and controlled by the electron tube 77. A reference wave of the character indicated at 78 in Fig. 15 and shifted in phase relation to the deflecting voltages, is supplied to the grid of tube 77. Tube 77 serves as a wave-squaring device to provide an output wave of the character indicated at 79. The differentiating circuit including the condenser 80 and potentiometer 81 is employed to obtain a time derivative of the output of tube 77. The voltage curve supplied by the differentiating circuit will be of the character illustrated by the curve 82 and includes the "pips" 83 which serve to "trigger" the delayed multivibrator circuit. When the multivibrator circuit is so triggered, it functions to provide the square wave indicated at 84, and the length of the voltage impulse 85 will be determined by the setting of the potentiometer 81. When a voltage of the character represented by curve 84 is supplied through a buffer tube 86 and low capacitance coupling 87 to the cathode of the tube 1, the voltage so impressed on the cathode will be of the character represented by the curve 88, point 89 thereof occurring substantially at the peak of the deflection voltage waves. The Lissajous figure, produced through the modulation of the cathode thereof by a voltage wave of the character represented by the curve 88, will comprise a zone of highest intensity at the outer end thereof conforming to the point 89 of the voltage curve 88 with the intensity decreasing to the inner end thereof represented by the point 90 in the voltage curve 88.

Figure 16:
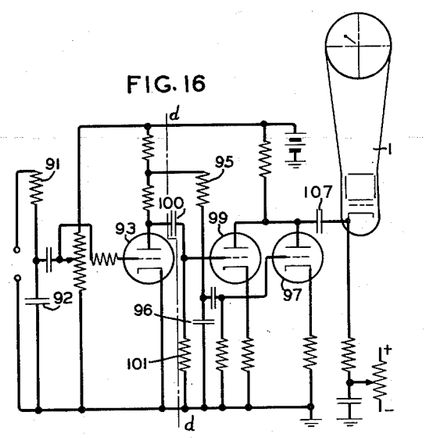
Fig. 16 is a wiring diagram of a further modified form of circuit.
Figure 17:
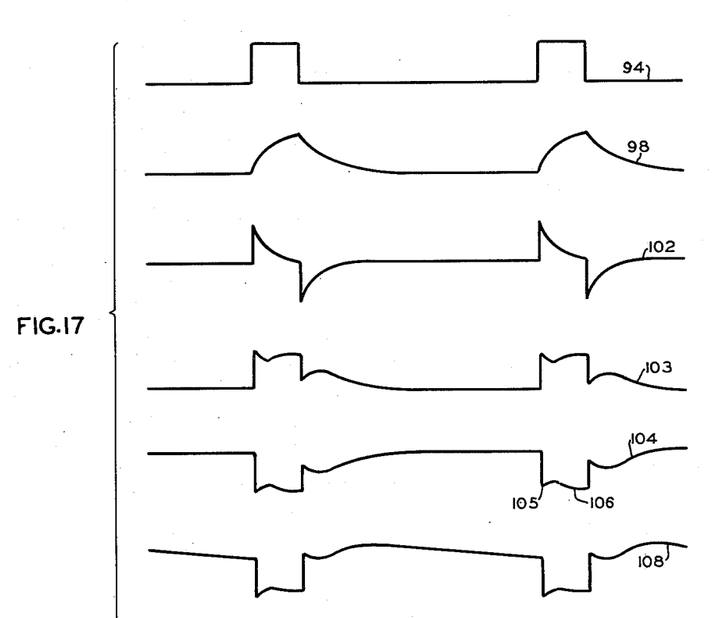
Fig. 17 represents the wave form of the voltage supplied by the circuit of Fig. 16.
Figure 18:
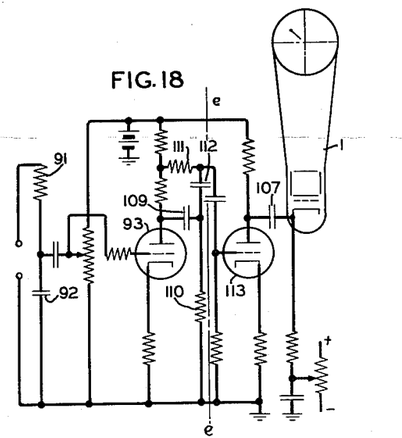
Fig. 18 is a wiring diagram somewhat similar to that of Fig. 16 but of modified form.

Another method of producing a Lissajous figure of substantially uniform intensity but with a bright spot at one end thereof is indicated in Figs. 16 and 18. Referring first to Fig. 16, a reference voltage is supplied to the circuit therein disclosed and through a phase-shifting circuit including the resistor 91 and condenser 92 is shifted in phase relation to the deflecting voltages on the plates of the cathode ray tube. Substantially in the same manner as hereinbefore described in connection with Fig. 10, the voltage so shifted in phase is supplied to the tube 93 which provides a square voltage wave output of the character indicated by the curve 94 in Fig. 17. An integrating circuit comprising the resistor 95 and condenser 96 is connected in the plate circuit of tube 93 and coupled to the grid of tube 97. This circuit functions to obtain a time integration component represented by the curve 98 which is supplied to the grid of tube 97. Additionally, a differentiating circuit is also connected to the output or plate of tube 93 and to the grid of tube 99. This circuit includes the condenser 100 and the resistor 101 which provide a time derivative of the output voltage from the plate of tube 93. This time derivative component is illustrated by the curve 102. The combined plate current outputs from the tubes 97 and 99 will be of the character indicated by curve 103, and the summation plate voltage which includes the integration and derivative components is represented by the curve 104. It will be observed that the resultant voltage impulse comprises an initial relatively high voltage component 105 followed by a lesser and gradually increasing component 106. When this voltage is impressed on the cathode of the cathode ray tube 1 through the low capacitance coupling 107, the voltage wave will be substantially of the character shown by the curve 108, that is, the portion thereof corresponding with component 106 of curve 104 will be substantially flat and therefore provide substantially uniform intensity of illumination of the Lissajous figure except for the bright spot at the end thereof. The circuit is, of course, arranged to supply the peak voltage 105 preferably at the peak of the deflecting voltage wave.

In Fig. 18, we have disclosed a circuit which will provide a modulating voltage of a wave form substantially conforming to that indicated by the curve 108 but in which the integration and derivative components are added together in an electronic mixer. As hereinbefore described, the reference wave is shifted by means of the phase-shifting circuit, part of which is shown as in Fig. 16 and includes the resistor 91 and the condenser 92. The wave is squared through the medium of tube 93, and a derivative thereof is obtained through the circuit including the condenser 109 and the resistor 110. The integration component is obtained through the circuit including the resistor 111 and the condenser 112, and since the latter circuit is connected to the differentiating circuit in an additive manner, a summation component of the derivative and the integration components will be supplied to the grid of tube 113. From the plate of tube 113 a voltage wave conforming to that indicated at 104 in Fig. 17 will be supplied through the low capacitance coupling 107 to the cathode of tube 1, the cathode modulating voltage being of the character represented by curve 108.

In the foregoing description of our invention, we have, with the exception of the description directed to Fig. 12, described circuits employed in voltage modulation of the cathode of the cathode ray tube. However, the voltage on the grid of the cathode tube may likewise be modulated to control the appearance of the Lissajous figure in substantially the same manner as hereinabove set forth, and, in Figs. 19 through 24, we have disclosed various manners in which the circuits hereinbefore described may be modified for grid modulation purposes.

In connection with the circuits described in the following, it will be understood that the grid of the cathode ray tube is preferably biased slightly below a value providing cathode ray emission so that emission will occur only when a modulating voltage is supplied thereto.

Figure 19:
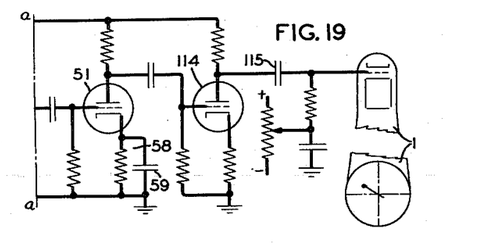
Fig. 19 is a wiring diagram showing how the circuit of Fig. 10 may be modified for grid voltage modulation.
Figure 20:
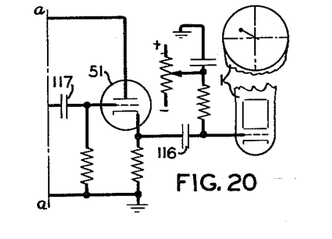
Fig. 20 discloses another manner in which the circuit of Fig. 10 may be modified to provide grid voltage modulation.

The circuit of Fig. 10 may be changed in the manners disclosed in Figs. 19 and 20 for grid modulation purposes. In Fig. 19, tube 51 corresponds to the similarly numbered tube in Fig. 10, and the circuit of Fig. 19 may be substituted for that portion of the circuit of Fig. 10 to the right of the dot-dash line a—a. In this embodiment of our invention, however, the output from the plate of tube 51 is supplied to the grid of tube 114 of a wave inverter stage rather than being directly coupled to the cathode of the tube as shown in Fig. 10. The output of tube 114 is derived from the plate thereof and coupled through condenser 115 to the grid of the cathode ray tube 1.

Hence, the circuit of Fig. 10 will supply a modulating voltage to the cathode tube element of the cathode ray tube, while the circuit modified as disclosed in Fig. 19 will supply a modulating voltage to the grid element. In each case, the Lissajous figure will have substantially the same appearance.

Instead of employing an inverter stage as disclosed in Fig. 19 to modify the circuit of Fig. 10 for grid modulation, the circuit of Fig. 10 may be altered as shown in Fig. 20. The showing in this figure, likewise, may be substituted for that portion of Fig. 10 which lies to the right of dash-dot line a—a. In this embodiment, however, the plate of tube 51 is preferably connected directly to the plate voltage supply battery, and the output of the circuit or the modulating voltage is derived from the cathode of tube 51, the cathode being connected through coupling condenser 116 to the grid of cathode ray tube 1. The coupling condenser 117, in this embodiment, through which the output from tube 46 is supplied to tube 51, preferably provides a relatively small time constant in combination with the grid-leak resistor associated with it.

Figure 21:
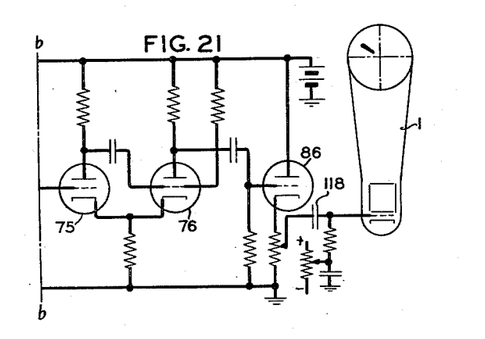
Fig. 21 is a wiring diagram showing how the circuit of Fig. 14 may be modified to provide grid voltage modulation.

The circuit of Fig. 14 may likewise be modified as disclosed in Fig. 21 for grid modulation purposes, the circuit of Fig. 21 being substituted for that portion of the circuit of Fig. 14 lying to the right of dash-dot line b—b. In Fig. 21, the tubes 75 and 76 correspond to the similarly numbered tubes of the multivibrator circuit of Fig. 14. However, the output from the multivibrator circuit is taken from the plate of tube 76 rather than from the plate of tube 75 and supplied to the grid of buffer tube 86. The grid modulating voltage is taken from the cathode circuit of tube 86 and coupled to the grid of the cathode ray tube 1 through the coupling condenser 118.

Figure 22:
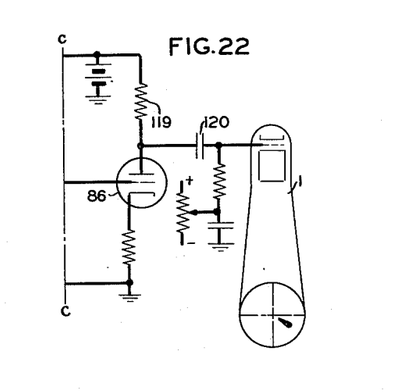
Fig. 22 similarly discloses one manner in which the circuit of Fig. 14 may be slightly modified for grid modulation purposes.

A grid modulating voltage may be derived from the circuit of Fig. 14 by coupling the grid of the cathode ray tube with the plate of buffer tube 86 and inserting a resistance between the plate and the source of plate potential. This variation of that portion of the circuit of Fig. 14 lying to the right of line c—c is represented in Fig. 22 wherein a resistor 119 is interposed in the plate circuit between the plate of tube 86 and the source of plate potential and coupling condenser 120 is connected between the grid circuit of the cathode ray tube and the plate of tube 86.

Figure 23:
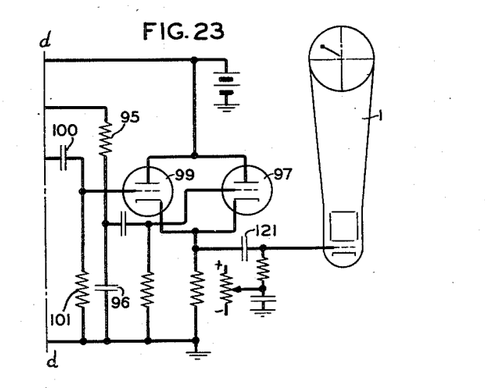
Fig. 23 discloses how the circuit of Fig. 16 may be modified for grid modulation purposes.

In Fig. 23 we have shown one manner in which the circuit of Fig. 16 may be modified for grid modulating purposes, and the circuit of Fig. 23 may be substituted for that portion of Fig. 16 lying to the right of dot-dash line d—d. In its modified form, the circuit including the differentiating circuit, comprising condenser 100 and resistor 101, and the integrating circuit, comprising resistor 95, and condenser 96, is arranged to add together the derivative and integration component in the cathode circuits of tubes 97 and 99, and the summation of these components may then be derived from the cathode circuits and supplied to the grid of the cathode ray tube. In other words, the derivative component is supplied to the grid of tube 99, and the integration component is supplied to the grid of tube 97. The cathodes of these tubes are connected together, as shown, and through the coupling condenser 121 to the grid circuit of the cathode ray tube 1. The appearance of the Lissajous figure of the cathode ray tube will be substantially the same for either grid or cathode modulation when the circuits of Fig. 16 or Fig. 16, modified as shown in Fig. 23, are employed.

Figure 24:
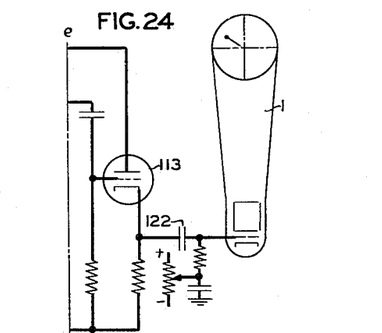
Fig. 24 shows how the circuit of Fig. 18 may be modified to provide grid modulation.

Fig. 18 may likewise be modified as shown in Fig. 24 to supply a modulating voltage to the grid of the cathode ray tube. The circuit of Fig. 24 may be substituted for that of the portion of Fig. 18 appearing to the right of dot-dash line e—e, and, as is clearly shown, the cathode of tube 113 instead of the plate thereof is coupled through condenser 122 to the grid of the cathode ray tube 1.

In Figs. 10, 14, 16, and 18, we have disclosed circuits in which the voltage on the cathode of a cathode ray tube may be modulated to control the duration and intensity of the Lissajous figure. The cathode voltage and likewise the grid voltage may be modulated to effect substantially the same control over the appearance of the Lissajous figure, and it will be understood that Figs. 19 through 24 have been presented in such a manner as clearly to illustrate how the first-mentioned group of figures, respectively, may be so modified as to supply grid-modulating voltages effecting substantially equivalent intensity modulation of the Lissajous figures.

Figure 25:
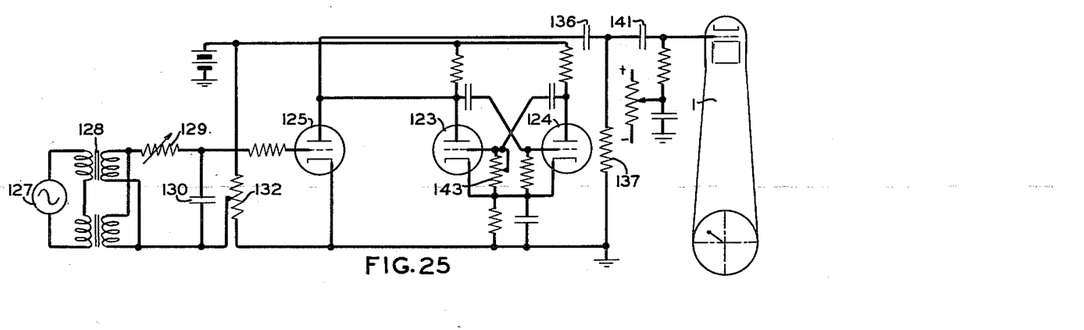
Fig. 25 discloses a modified form of controlled multivabrator circuit which may be employed either for grid or cathode modulation.
Figure 26:
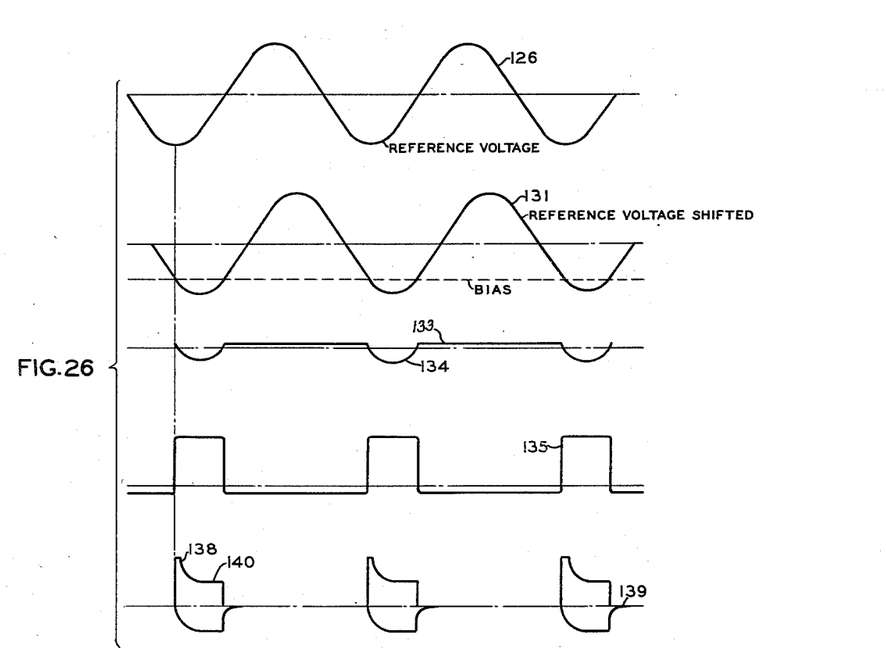
Fig. 26 represents schematically the nature of the control and output voltages of the circuit of Fig. 25.

Additionally, we have shown in Fig. 25 a circuit whose voltage output may be used either in modulating the grid or the cathode tube elements of a cathode ray tube. The circuit of Fig. 25 includes a multivibrator circuit comprising the electron tubes 123 and 124, and this multivibrator circuit is generally similar to that shown in Fig. 12. Likewise, a control tube 125 is connected in shunt with the multivibrator circuit and functions to control the operation thereof. In accordance with this embodiment of our invention, a reference voltage such as that represented by the curve 126 in Fig. 26 is derived from a source of alternating current 127 which, it is assumed, is in phase with the deflecting voltages supplied to the deflecting plates of the cathode ray tube 1. This reference voltage is coupled through inductive coupling 128 to a phase-shifting circuit comprising the variable resistor or potentiometer 129 and condenser 130. The phase-shifting circuit functions to shift the reference voltage supplied to the grid of control tube 125 with respect to the deflecting voltages on the deflecting plates of the cathode ray tube, as represented by the curve 131 in Fig. 26. The potentiometer 132 is employed to bias the grid of tube 125 and narrow the negative half of the voltage wave as represented by the curve 133.

Since the control tube 125 is connected in shunt with the multivibrator circuit, when the control tube 125 conducts, the multivibrator circuit will be cut off thereby, and vice versa. Hence, for values of grid voltage represented by the zones 134 of curve 133, the multivibrator circuit will provide an output, the envelope thereof being of the character represented by curve 135. Actually, the envelope as so represented merely follows the outline of a plurality of oscillations which occur when the control tube is cut off. Due to the phase shifting of the reference voltage wave, each output impulse or group of oscillations will start as the peak or maximum amplitude of the deflecting voltages on the deflecting plates of the cathode ray tube is reached.

In this circuit, the multivibrator output is derived from the plate of tube 123 and is supplied to a differentiating circuit having a small time constant and including the condenser 136 and resistor 137. This circuit differentiates the fundamental square wave component present in the modulated multivibrator output and will produce a "pip" at the beginning of each operation of the multivibrator as indicated at 138 in the curve represented generally at 139. Following the initial, relatively high voltage output component, the balance of the voltage output impulse from the differentiating circuit will be of substantially uniform magnitude, as indicated at 140. The output is then coupled through condenser 141, in the embodiment illustrated, to the grid circuit of cathode ray tube 1 which has a relatively long time constant. On the other hand, the output may be coupled to the cathode of the tube. The envelope shown in curve 139 represents the outline of the wave form shown in Fig. 27.

Figure 27:
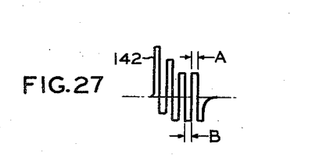
Fig. 27 schematically represents the wave form of the modulating voltage impulse derived from the circuit of Fig. 25.

The oscillating voltage wave indicated generally at 142 in Fig. 27 may be made to extend to equal distances on either side of the axis of the voltage wave or predominantly to either side thereof, and hence this voltage may be applied either to the grid or the cathode of the cathode ray tube. Furthermore, since the time constant of the differentiating circuit is preferably relatively small, this voltage wave may be applied to the grid or cathode tube element through the coupling condenser 141 and associated tube element circuit having a small time constant but larger than that of the differentiating circuit without any appreciable change in wave form.

If the output of the multivibrator circuit is supplied to the grid of the cathode ray tube, a "pip," as above described, will appear at the beginning of the multivibrator action. However, if the output is applied to the cathode of the cathode ray tube, a Lissajous figure of fairly uniform intensity will result. The height of the "pip" may be adjusted by varying the time constant of the multivibrator to change the ratio of the values A and B represented in Fig. 27. The potentiometer 143 in the multivibrator circuit may be employed for this purpose. Adjustment of the potentiometer 143 changes the magnitude of the fundamental square wave component and hence the height of the "pip" at the output of the differentiating circuit, and the nature of the "pip" is determined by the time constant of the differentiating circuit. Furthermore, the ratio of A to B, illustrated in Fig. 27, also establishes the axis of the voltage wave with respect to the multivibrator oscillations. For example, if B is larger than A, the positive pulses will be higher and the "pip" relatively smaller. When the output of this circuit is applied to the cathode of the cathode ray tube, the value A should be larger. The position of the "pip" relative to the Lissajous figure and the length of the intensified portion thereof may be controlled by the potentiometers 129 and 132.

It is to be observed that if the output of the multivibrator circuit is derived from the plate of tube 124 instead of from the plate of tube 123, an additional "pip" will be provided when the multivibrator is cut off because, when this occurs, tube 124 is cut off and then allowed to start conducting more slowly because the multivibrator action is stopped. This produces in the Lissajous figure a detached spot which could be made to appear by proper phase shifting at substantially any point on the Lissajous figure.

In the foregoing, we have illustrated and described the circuits which provide for controlled intensity modulation of the cathode ray emission of a cathode ray tube and wherein not only is the length of the linear Lissajous figure controlled in so far as the visible portions thereof are concerned, but also a variation in the intensity thereof is provided. It is believed evident that in the practice of our invention we may modulate the intensity of a Lissajous figure whereby to render it of asymmetrical appearance and thereby provide both a phase sense and directional indication. Furthermore, we may foreshorten or cut off one end of the otherwise fully visible Lissajous figure, or we may foreshorten and intensify a portion of the figure to provide phase sense and directional indications.

In some cases, it is desirable to provide a Lissajous figure having substantially equal portions thereof on opposite sides of the electrical center of the tube as, for example, when employed in connection with a scanner unit so that, when it is desired to bring the axis of the scanner member into parallelism with a chosen reference axis such as the fore and aft axis of the craft, the operator may effect a movement thereof toward this position and may readily determine when this position is reached by observing the Lissajous figure becoming foreshortened from both ends thereof and reducing to a dot at the electrical center of the screen when the position is reached.

One advantage of employing a cathode ray Lissajous figure resides in the fact that the indication provided thereby is free from any calibration of the screen whereby, if shifting of the electrical center of the tube should occur, no error will result. Furthermore, the use of a cathode ray tube for representing data from a data transmission system provides a coercion-free positional and directional indicating means which will produce no reaction in the data system with which it may be associated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a visual position indicator, the combination with a displaceable member of means for producing a pulsating signal voltage proportional in amplitude to the magnitude of displacement of said member relative to a reference position, a cathode ray tube provided with means electrically connected with said signal-producing means and operable in accordance with the voltages supplied thereto to control the angular position of the path traced by the fluorescent spot due to the cathode ray relative to the electrical axis of the tube, and means for decreasing the intensity of said cathode ray for a portion of its trace path to render the figure traced by said spot of asymmetrical appearance with respect to said electrical axis.

2. In a visual position indicator, the combination with a displaceable member of means for producing a pulsating signal voltage proportional in amplitude to the magnitude of displacement of said member relative to a reference position, a cathode ray tube provided with means electrically connected with said signal-producing means and operable in accordance with the voltages supplied thereto to produce a substantially straight line trace and to control the position of the path traced by the fluorescent spot due to the cathode ray, and means for varying the intensity of the ray in timed relation to said pulsating signal voltage.

3. In a visual position indicator, the combination with a displaceable member of means for producing a pulsating signal voltage proportional in amplitude to the magnitude of displacement of said member relative to a reference position, a cathode ray tube provided with means electrically connected with said signal-producing means and operable in accordance with the voltages supplied thereto to effect a tracing of a substantially rectilinear Lissajous figure by the fluorescent spot due to the cathode ray, and means for providing a visual differentiation of one end of the figure so traced by said spot with respect to the other end.

4. In a visual position indicator, the combination with a displaceable member of means for producing a pulsating signal voltage proportional in amplitude to the magnitude of displacement of said member relative to a reference position, a cathode ray tube provided with means electrically connected with said signal-producing means and operable in accordance with the voltages supplied thereto to effect a rectilinear tracing of a Lissajous figure by the fluorescent spot due to the cathode ray, and means for cutting off the cathode ray emission for a determinable period and in timed relation to said pulsating signal.

5. In a visual position indicator, the combination with a displaceable member of means for producing a pulsating signal voltage proportional in amplitude to the magnitude of displacement of said member relative to a reference position, a cathode ray tube provided with grid and cathode tube elements and with means electrically connected with said signal-producing means and operable in accordance with the voltages supplied thereto to produce a substantially straight-line trace and to control the position of the path traced by the fluorescent spot due to the cathode ray, and means for modulaing the voltage on one of said tube elements whereby periodically to vary the intensity of the cathode ray.

6. In a visual position indicator, the combination with a displaceable member of means for producing a pulsating signal voltage proportional in amplitude to the magnitude of displacement of said member relative to a reference position, a cathode ray tube provided with grid and cathode tube elements and with means electrically connected with said signal-producing means and operable in accordance with the voltages supplied thereto to control the position of the figure traced by the fluorescent spot due to the ray, and means for modulating the voltage on one of said tube elements whereby periodically to vary the intensity of the cathode ray, said modulating means including bias means for cutting off the emission thereof for a determinable time interval relative to said pulsating signal.

7. In a visual position indicator, the combination with a displaceable member of means for producing pulsating signal voltages respectively proportional in amplitude to the magnitude of two vector components of the displacement of said member relative to a reference position, a cathode ray tube provided with means electrically connected with said signal-producing means and operable in accordance with the voltage signals supplied thereto to position the figure traced by the cathode ray in representation of the resultant of said vector components, and means for controlling a magnitude of said cathode ray figure on opposite sides of the electrical center of said tube whereby to supply a direction indication to the resultant represented by said figure.

8. In a visual position indicator, the combination with a displaceable member, of means for producing pulsating signal voltages respectively proportional in amplitude to the magnitude of two vector components of the displacement of said member relative to a reference position, a cathode ray tube provided with means electrically connected with said signal-producing means and operable in accordance with the voltage signals supplied thereto to position the figure traced by the cathode ray in representation of the resultant of said vector components, and means for varying the intensity of the cathode ray whereby to supply a direction indication to the resultant represented by said figure.

9. In a scanning system comprising a scanning member rotatable in azimuth and in elevation, means for providing voltage signals proportional in amplitude respectively to the displacements of said scanning member in azimuth and elevation relative to a reference position, a source of alternating current energy for said signal-producing means, a cathode ray tube provided with means electrically connected with said signal-producing means and operable in accordance with the voltages supplied thereto to control the angular position of the path traced by the cathode ray on the screen of the tube, and means connected with said source of energy for varying the intensity of the cathode ray in timed relation to said signal voltages whereby to provide a phase-designating position indication of said scanning member.

10. The combination with a positional data transmission system comprising transmitter and receiver means and a circuit connecting the same, of a cathode ray tube provided with means electrically connected in said circuit and operable in accordance with the voltages supplied thereto to control the angular position of the path traced by the fluorescent spot due to the cathode ray on the screen of the tube, and means for modifying the intensity of the figure formed by said spot, whereby a phase-designating positional indication is afforded by said tube.

11. In a device for indicating the position of a movable member, means for producing a pulsating signal voltage proportional in amplitude to the magnitude of displacement of said member relative to a reference position, a cathode ray tube provided with grid and cathode tube elements and with means electrically connected with said signal-producing means and operable in accordance with the voltages supplied thereto to produce a straight-line trace and to control the position of the path traced by the fluorescent spot due to the cathode ray, and an electrical circuit associated with one of said tube elements and including means for applying thereto a potential in timed relation to said signal voltage.

12. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the fluorescent spot due to the cathode ray, and an electrical circuit connected with said energy source and associated with the cathode of said tube, said circuit including means for applying to one of said tube elements a potential of sufficient magnitude and shortness of duration as to produce a spot-like appearance in the intensity of the figure traced by said ray at a point therein.

13. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to produce a rectilinear trace and to control the position of the path traced by the cathode ray, and an electrical circuit connected with said energy source and associated with one of said tube elements, said circuit including means for applying to said selected element a potential of varying magnitude in timed relation to said signal voltage.

14. In a device for indicating the position of a movable member, means for producing an alternating signal voltage proportional in amplitude to the magnitude of displacement of said member relative to a reference position, a source of alternating current energy for said means, a cathode ray tube provided with plural tube elements and with means electrically connected with said signal-producing means and operable in accordance with the voltages supplied thereto to control the position of the path traced by the cathode ray, and an electrical circuit connected with said energy source and associated with one of said tube elements, said circuit including means for applying a potential impulse in timed relation to said signal voltage and of sufficient magnitude as to produce a visually detectable modulation of the ray emission from the cathode of said tube, said last-mentioned means including means for producing a component of said impulse of relatively high amplitude and of short duration and means for rendering the remainder of said impulse of substantially uniform value in amplitude.

15. In a device for indicating the position of a movable member, means for producing an alternating signal voltage proportional in amplitude to the magnitude of displacement of said member relative to a reference position, a source of alternating current energy for said means, a cathode ray tube provided with plural tube elements and with means electrically connected with said signal-producing means and operable in accordance with the voltages supplied thereto to control the position of the path traced by the cathode ray, and an electrical circuit connected with said energy source and associated with one of said tube elements, said circuit including means for suddenly applying to said tube element a potential of relatively high value at substantially the peak of the signal voltage on the ray-positioning means of said tube.

16. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with one of said tube elements, said circuit comprising means for producing a high frequency alternating voltage, and means for applying said voltage to a tube element of said tube for an interval in timed relation to the signal voltage on the ray-positioning means of said tube.

17. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit comprising multivibrator means for producing a substantially square wave voltage output, and means for controlling said output in duration and phase relation to the signal voltage on the ray-positioning means of said tube.

18. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit comprising multivibrator means for producing a voltage output, means for controlling said output in duration and phase relation to the signal voltage on the ray-positioning means of said tube, and capacitance coupling means for applying said output to the cathode of said tube.

19. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for deriving a substantially square wave voltage shifted in phase relation to the voltage on the ray-positioning means of said tube, means for obtaining a summation voltage of integral and differential components of said square wave voltage, and capacitance coupling means for applying said summation voltage to the cathode of said tube.

20. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for shifting the phase of the energy wave supplied thereto from said energy source in relation to the voltage on the ray-positioning means of said tube, means for deriving from said shifted energy wave a voltage comprising an initial, relatively high component of short duration and a component of lesser but gradually increasing amplitude, and capacitance coupling means for applying said voltage to a tube element of said tube.

21. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for shifting the phase of the energy wave supplied thereto from said energy source in relation to the voltage on the ray-positioning means of said tube, means for deriving from said shifted energy wave a voltage wave having steep sides, means for adding an integration component to said voltage wave whereby to provide a steep sided voltage wave of substantially uniformly increasing amplitude between sides, means for deriving from said last mentioned voltage wave a resultant voltage wave comprising an initial, relatively high component of short duration and a component of lesser but substantially uniformly increasing amplitude, and capacitance coupling means for applying said resultant voltage to a tube element of said tube.

22. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for deriving from the energy wave supplied thereto from said energy source a substantially square wave shifted in phase relation to the voltage on the ray-positioning means of said tube, means for deriving from said shifted wave an integration component thereof, means for deriving from said shifted wave a derivative component thereof, and means for adding said integration and derivative components and applying the summation component to a tube element of said tube.

23. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for shifting the energy wave supplied thereto in phase relation to the voltage on the ray-positioning means of said tube, means for controlling the shape and length of the positive and negative components of said shifted wave, means for providing a voltage wave substantially conforming in duration with the length of one of said shifted wave components, and means for applying said last mentioned voltage wave to a tube element of said tube.

24. In a device for indicating the position of a movable member, means for producing an alternating signal voltage proportional in amplitude to the magnitude of displacement of said member relative to a reference position, a source of alternating current energy for said means, a cathode ray tube provided with grid and cathode tube elements and with means electrically connected with said signal-producing means and operable in accordance with the voltages supplied thereto to control the position of the path traced by the cathode ray, and an electrical circuit connected with said energy source and associated with a tube element of said tube, said circuit including means for shifting the energy wave supplied thereto in phase relation to the voltage on the ray-positioning means of said tube, means controlled by said shifted voltage wave for producing a modulating voltage impulse having one component of relatively large magnitude but of short duration relative to the magnitude of the balance of said impulse and the duration of said impulse, and means for applying said modulating voltage to a tube element of said tube.

JAMES E. SHEPHERD.
JOHN D. MALLETT.